Oct. 28, 1952 M. V. KALFAIAN 2,615,986

PHASE MODULATION SYSTEM

Filed Jan. 20, 1948 3 Sheets-Sheet 1

INVENTOR.

Mgen V. Kalfaian

Oct. 28, 1952 M. V. KALFAIAN 2,615,986

PHASE MODULATION SYSTEM

Filed Jan. 20, 1948 3 Sheets-Sheet 2

INVENTOR.

Meyer Kalfaian

Oct. 28, 1952 M. V. KALFAIAN 2,615,986

PHASE MODULATION SYSTEM

Filed Jan. 20, 1948 3 Sheets-Sheet 3

INVENTOR.

Mayer V. Kalfaian

Patented Oct. 28, 1952 2,615,986

UNITED STATES PATENT OFFICE 2,615,986

PHASE MODULATION SYSTEM

Meguer V. Kalfaian, Hollywood, Calif.

Application January 20, 1948, Serial No. 3,318

9 Claims. (Cl. 179—15)

Figure 2:
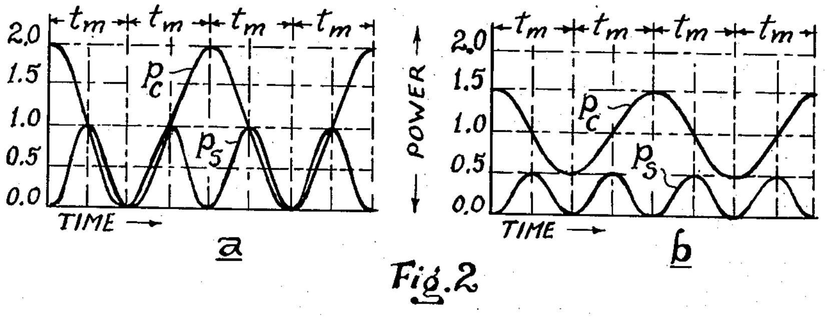

This invention relates to time-division modulating systems, and more particularly to methods and means for modulating phase angle of the time-divided carrier wave. One object of the invention is to waveshape the amplitude rise and fall of the time-divided carrier envelopes, so as to avoid widely expanded multiple pairs of sideband components that are usually associated with steep sided envelopes. Another object is to control phase angle of the carrier oscillation in each succeeding envelope, so as to avoid effective frequency modulation. A further object is to eliminate the necessity of a reference carrier wave at the receiving end, for detection of the original intelligence.

In one mode of phase modulation, the carrier phase is shifted representative of intelligence, against a reference carrier of constant phase. To re-translate this modulated carrier into the original intelligence, a reference carrier is produced at the receiver, and the phases of the two carriers are compared for detection. However, local generation of the carrier at the receiver is usually impractical, in that, it is difficult to retain the frequency and phase of the oscillator constant. For this reason, various schemes have been proposed in the past, to supply the reference carrier by the transmitter. Reference to one of these schemes may be made to a disclosure in Patent #2,403,385 issued to W. R. Bennett on July 2, 1946.

To obviate the necessity for a reference carrier at the receiver, I provide means to time divide the carrier wave, and shift the phase angle of the carrier in each succeeding time division, representative of intelligence, by a difference-angle measurable from a preceding angle, whereby each preceding phase change represents a reference angle to a succeeding step of phase change. Detection of this type of phase modulation is achieved by passing the incoming carrier wave through two separate circuits of dissimilar decrements, and comparing the dissimilar phase angles of their carrier outputs as a function of the original intelligence.

In the case that the carrier were interrupted abruptly at a time-dividing frequency $f_m$, and the modulation frequencies varied maximum to $f_m/2$, the sidebands would repeat successively in complementary pairs around the carrier, occupying frequency spaces between $f_c \pm f_m$, $f_c \pm 2f_m$, $f_c \pm 3f_m$ etc., with gradually diminishing amplitudes. Similarly, if the carrier had contained phase modulation, the time-period of each carrier-cycle would change from normal, and cause effective frequency modulation with corresponding swing of the sidebands. However, these repeated sidebands may be narrowed to the first pair by waveshaping the amplitude rise and fall of each time-divided envelope to the simple curve of the sine-squared function. Similarly, in order to avoid effective frequency modulation, the carrier phase may be shifted stepwise; changing abruptly at the boundaries of each envelope; provided that the carrier amplitude is held negligibly low at the boundaries, so as to avoid sudden transient effect between adjacent envelopes of the carrier. The behavior of this type of sideband restriction may be explained by the following analysis:

*Side-frequency-wave and bandwidth*

In pure amplitude modulation, the behavior of side-frequency-wave as produced by the carrier wave, and bandwidth as occupied by information, are characteristically different one from the other. The first is manifested to be effected by the time shift of the carrier wave maxima, and the second is determined by the frequency rate at which the carrier amplitude changes. The second case may be explained briefly (for comparison purpose) by an example of sinusoidal modulation, where composite frequencies are represented by the fundamental and two complementary side frequencies. As is well known, a sharply tuned circuit will respond maximum when resonated at any one of these three frequencies, but negligibly minimum at all other frequencies. When the resonance of the circuit is tuned close to the fundamental, the carrier cycles assume an in-phase relation with the resonant frequency of the circuit for a considerable length of time, and contribute an oscillatory excitation therein. However, the carrier cycles gradually become out of phase with the free oscillation of the circuit, and (because of symmetry in amplitude reversal) cancel out the original contribution. With the assumption that the resolution time constant of the circuit is low, compared to the time of phase reversal, the magnitude of stored oscillation at the output will be negligible. When the circuit is continually tuned away from the fundamental, the length of time during which such contribution and cancellation occurs becomes less and less, until at side-frequency point (where this time-period constitutes one cycle of the modulation frequency), the tuned circuit displays a sharp response to the carrier (side frequency), which evidently is not due to the amplitude-change of the carrier, but some other phenomena that represents frequency-change. These phenomena may be explained as in the following:

*Side-frequency-wave*

In the simple case of pure amplitude modulation, the zero crossings of the carrier wave are spaced equally, and therefore, the carrier represents fundamentally a single frequency. However, in the act of amplitude change, the maxima of the carrier half-cycles shift from normal time positions, which behave as though the carrier half-cycles were changing in time, and possessing additional frequency components. Accordingly, a modulated carrier voltage has essentially two components, one emanating from the carrier voltage without experiencing time shift of the maxima, and one emanating from the carrier voltage that experiences these time shifts.

The power derived from the carrier voltage that experiences time shift of the maxima is attributed to the side-frequency-waves, since in their absence this voltage is also absent. Hence, if we determine the output of this power, we will determine the power contribution of the side-frequency-waves at any given instant.

The carrier voltage that experiences these time shifts may be found by writing the modulation voltage, as:

$$e=(a+b\cos\theta_m)\cos\theta_c \tag{1}$$

where, $\theta_m$ and $\theta_c$ are the instantaneous phase phase angles of the sinusoidal modulation envelope and the carrier respectively, while $a$ and $b$ are constants. In general, $b$ is smaller or equal to $a$, and therefore, we may write Equation 1, as:

$$e=a(1+K\cos\theta_m)\cos\theta_c \tag{2}$$

To find the positive and negative shift of the maxima, we may differentiate Equation 2 and set the derivative equal to zero.

$$\frac{de}{dt}=-a(1+K\cos\theta_m)\sin\theta_c\frac{d\theta_c}{dt}-aK\sin\theta_m\cos\theta_c\frac{d\theta_m}{dt}=0 \tag{3}$$

$$\frac{d\theta_m}{dt}=2\pi f_m \text{ and } \frac{d\theta_c}{dt}=2\pi f_c$$

Accordingly, Equation 3 may be simplified and solved for $\theta_c$, as follows:

$$\tan\theta_c=-(f_mK\sin\theta_m)/f_c(1+K\cos\theta_m) \tag{4}$$

$$\phi=-\arctan\left((f_m/f_c)(K\sin\theta_m)/(1+K\cos\theta_m)\right) \tag{5}$$

where, $\phi$=lateral shift of the maxima from normal.

By further simplifying Equation 5:

$$\phi=\arctan(Kf_m/f_c) \tag{6}$$

$$f_m=f_c\tan\phi/K \tag{7}$$

Equation 7 shows that the term $(f_c\tan\phi/K)$ is the added carrier component that experiences time shift of the maxima. Therefore, the fundamental carrier contains plus and minus this component, which contributes to the side-frequency-waves.

Since $(f_c\tan\phi/K)$, is equal to the impressed modulating frequency $f_m$, we may determine the power contributions $P_s$ of this component at a given instant, by first writing the instantaneous voltage and current of $f_m$, as:

$$e_m=KE_m\sin\omega_mt,\ i_m=KI_m\sin\omega_mt \tag{8}$$

The power $P_s$ may be written by multiplying the two terms of current and voltage, as:

$$P_s=KE_mI_m\sin^2\omega_mt \tag{9}$$
$$=K\tfrac{1}{2}E_mI_m(1-\cos 2\omega_mt)$$

The average value of $(\cos 2\omega_mt)$ is zero, hence the average value of power is:

$$P_s=\tfrac{1}{2}E_mI_m \tag{10}$$

Equation 10 agrees with the average value of power generally given for side components. However, Equation 9 shows that the frequency associated with the power arising from side-frequency-wave is exactly twice the frequency of the impressed modulating voltage. Furthermore, it shows that the power output of side component is maximum at the steepest part of the modulating envelope. Accordingly, the phase relations of the instantaneous power output of the carrier and side components may be shown graphically as in Fig. 2, wherein, $a$ illustrates the condition existing in 100% modulation, and $b$ in 50% modulation.

It will be noted that the magnitude of carrier power $P_c$ varies from a fixed reference level equal to 1, whereas the power $P_s$ arising from side component varies from zero level. In other words, the power output of side component is 100% modulated at frequency $2\omega_m$, regardless of the modulation ratio K. This shows that the side components are not independent carriers as traditionally presented; if they were, the magnitude variations at frequency $2\omega_m$ would cause further pairs of their own side-frequency waves. The side components are merely possessed by the carrier wave when changed in magnitude from one steady state to another, in the form as indicated by Equation 7.

Figures 3, 4, 5:
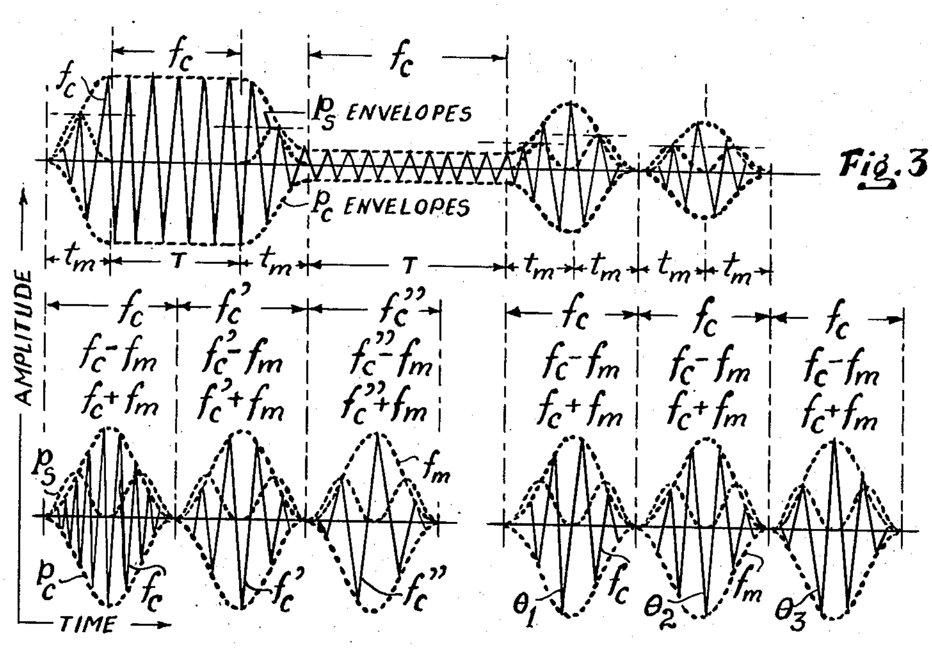
Figure 1:
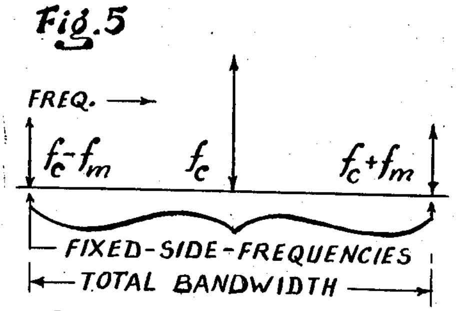

Fig. 3 shows one form of amplitude modulation, where the rate of amplitude change from one steady state to another is kept constant at a fixed time period $t_m$. In this case, there appears only one pair of complementary side-frequency-waves, and the shape of their power envelopes are indicated by the dotted lines. However, a modulation waveform such as shown occupies a bandwidth covering the entire space between the two side frequencies, as indicated in Fig. 1, even though the side-frequency-waves remain constant without side swings.

Here, the difference between side-frequency-wave and bandwidth is readily distinguished by the fact that, the first is manifested by the time shift of the carrier wave maxima from normal position, and the second is manifested as a consequence of dissymmetric contribution and cancellation of the carrier to the tuned circuit during a given time.

*Simultaneous AM and PH modulation*

Figure 6:
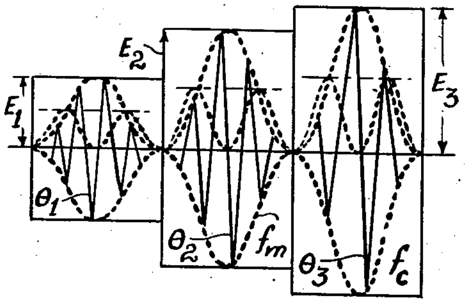

With reference to the foregoing, and in the ideal unity modulated example, each envelope of the carrier may be practically considered as an independent carrier unit without relationship to either preceding or succeeding units; provided its normal shape remains constant. Then again, since at the trough of the modulation envelope, both the side and carrier powers are practically zero, it matters not at what phase the carrier commences in each envelope; provided that the phase remains constant from boundary to boundary. Thus, these units may be transmitted without changing conditions of bandwidth and side-frequency-waves as previously described, by steady state sampling and waveshaping method as shown in Figs. 5 and 6; in the latter figure each envelope of the carrier carries simultaneous amplitude and phase representations of elemental informations. Fig. 4 is included to show how the sidebands will vary when frequency of the carrier is shifted stepwise from envelope to envelope.

Figure 7:
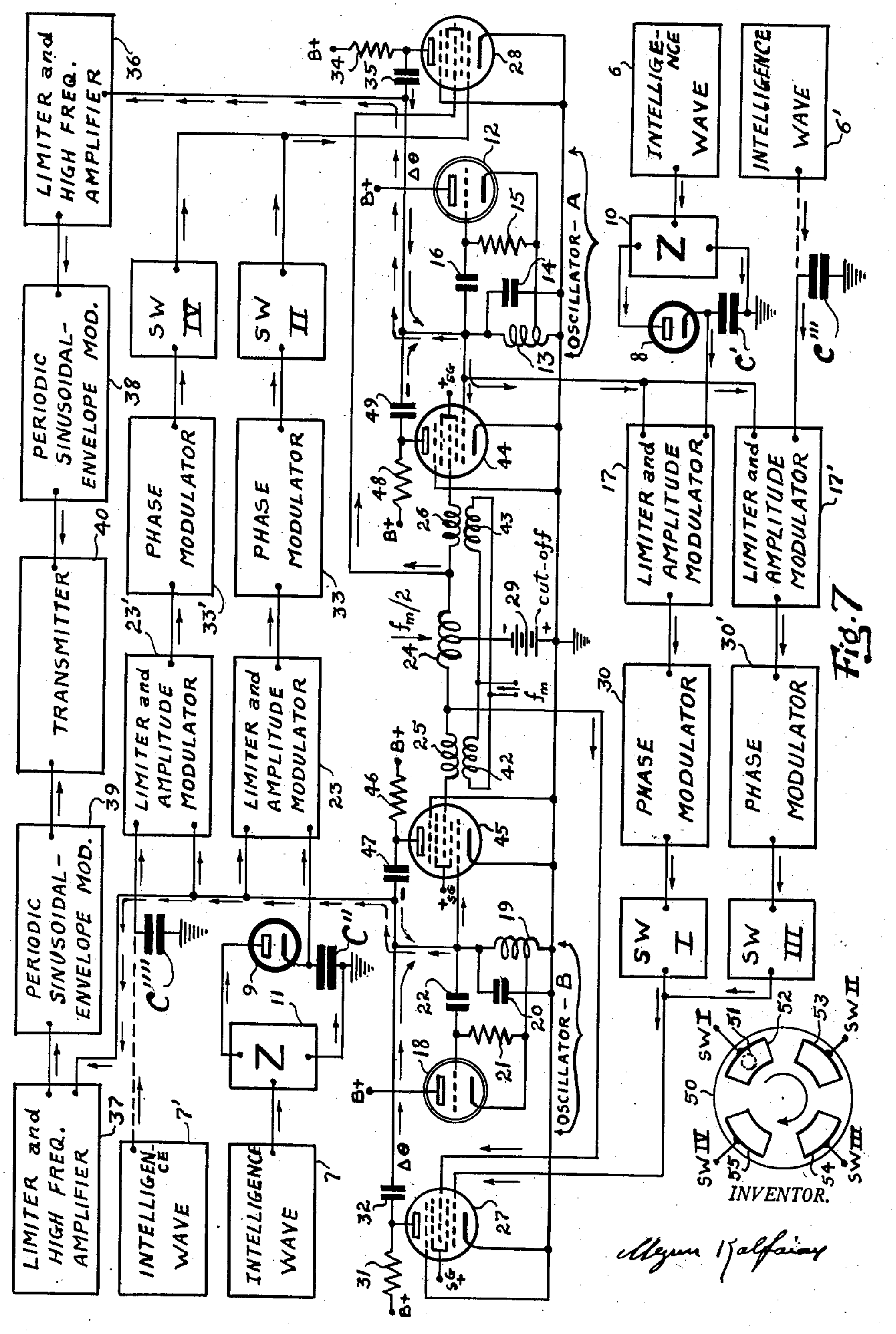
Figure 8:
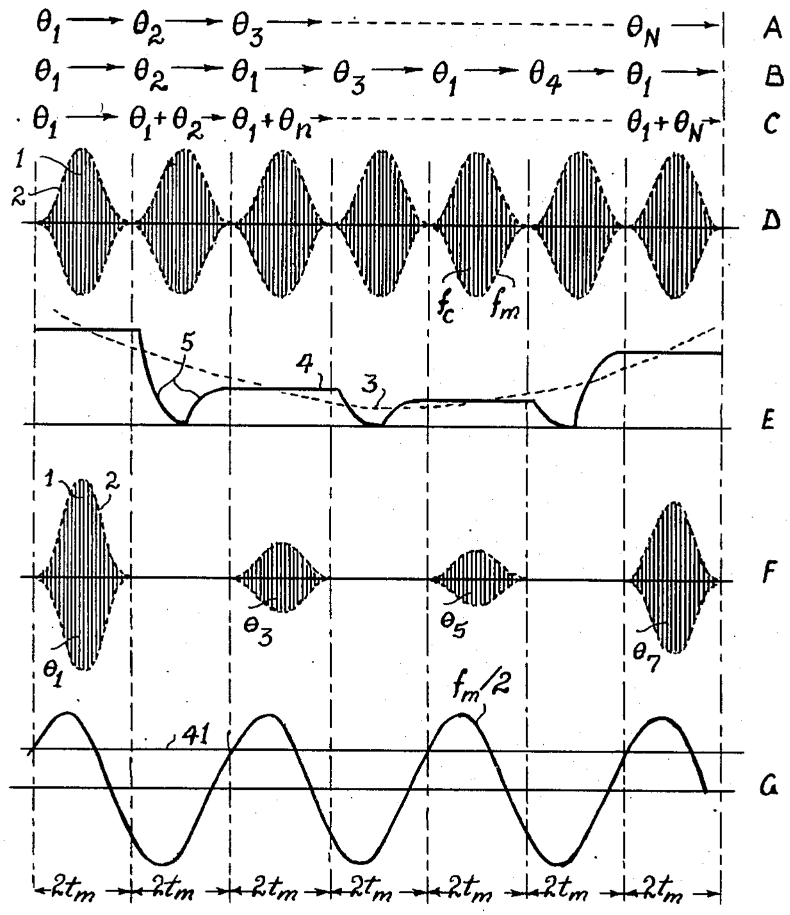
Figure 9:
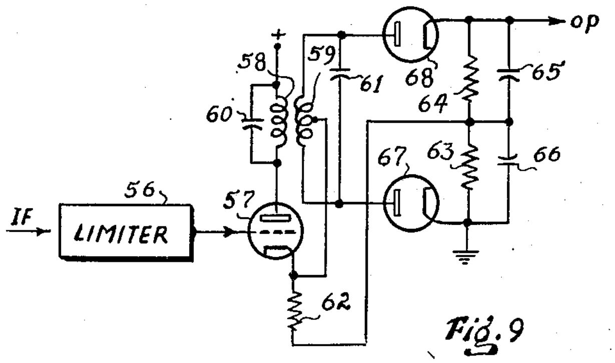

In view of the foregoing description of sideband behavior, and the method by which bandwidth of a time-divided carrier may be narrowed to restricted frequency regions, reference will now be made to methods and means by which modulation of the carrier wave may be controlled to meet the above stated requirements, when read in connection with the accompanying drawings, wherein:

Figs. 1 to 6 illustrate graphs and waveforms to describe sideband behavior; Fig. 8 illustrates how the carrier is produced and modulated by controlled waves; Fig. 7 illustrates partly schematic and partly block diagram of the phase modulator in accordance with the invention; and Fig. 9 illustrates schematic diagram of a phase demodulator in accordance with the invention.

In Fig. 8, a unity modulated carrier wave is shown at D. In order to shift both the peak amplitude and phase angle of the carrier, stepwise, the carrier wave is time-divided separately in first and second channels in alternate sequence, in a manner that, while the output of one channel is idle, both the carrier-phase and its peak amplitude are shifted (representative of intelligence) to steady states, whereby during the active output of that channel the carrier is produced without any wave distortion. To simplify the drawing, output of only one channel is shown at F, wherein, the carrier is produced in periodic envelopes of different peak amplitudes, and in different phase angles. The illustration at E shows how the modulating wave is produced. During quiescence at the output of one channel, the modulating wave is sampled, such as shown by the wave 5, so that this modulating wave remains in steady state (shown by straight line 4) during active carrier-output of that channel. Similarly, the carrier phase is shifted (representative of a second modulating wave) during idle periods of one channel, so that the phase remains in steady state during the active period of that channel. The original intelligence wave 3 is included in the drawing, to show how steady state samples are derived therefrom, for final modulation. For final transmission, output carrier oscillations of the first and second channels are combined, to form the required waveshape of Fig. 6.

Up to this point, simultaneous amplitude and phase modulation by two different intelligence waves had been indicated. However, such simultaneous AM and PH modulation had been disclosed in my copending application, Serial No. 752,601 filed Jan. 5, 1947. The main object of the present invention is to provide a type of phase modulation that obviates the necessity of a reference carrier at the receiving end, for demodulation. More specifically, the carrier phase is shifted stepwise in each succeeding time-divided envelope by an angle (representative of intelligence) that is measurable from a preceding step of the carrier phase. Thus, each preceding step of carrier phase represents a reference angle to a succeeding step of phase change. With such infinite change of the carrier reference-phase, if the envelopes in Fig. 5 were steep sided, it is obvious that the modulation would change into frequency modulation when passed through a tuned circuit of the proper decrement; owing to the fact that, the tuned circuit would delay its resolution to the sudden phase changes, and consequently effect changes in time of the carrier cycles. Accordingly, the method and means of phase modulation described herein is not restricted to any particular form of modulation, as it may also be employed for producing frequency modulation.

*PH modulator*

Fig. 7 consists of two carrier wave generators, A and B, which oscillate substantially at identical frequency. Numerous types of oscillators have been devised in the past, and any of those types will be found suitable in practice. As an exemplary arrangement however, Hartley type of oscillators are employed, wherein, A comprises oscillator tube 12, tank coil 13, tuning condenser 14, grid bias resistance 15, and isolating condenser 16. Similarly, B comprises oscillator tube 18, tank coil 19, tuning condenser 20, grid bias 21, and isolating condenser 22.

The output oscillations of tank coil 13 of oscillator A is passed through the limiter-and-amplitude-modulator block 17; through the phase modulator block 30; through distributor switch SWI, and applied upon the first control grid of gate tube 27. This oscillation appears across the plate circuit resistance 31, and is applied upon the tank coil 19 of oscillator B through coupling condenser 32. Similarly, the output oscillations of tank coil 19 of oscillator B is passed through the limiter-and-amplitude-modulator block 23; through the phase modulator block 33; through distributor switch SWII, and applied upon the first control grid of gate tube 28. This oscillation appears across the plate circuit resistance 34, and is applied upon the tank coil 13 of oscillator A through coupling condenser 35. The second control grids of gate tubes 27 and 28 are normally negative biased through the center tap of coil 24, by battery 29, so that, the plate currents of these gate tubes are normally idle. However, when an alternating voltage of time dividing frequency $f_m/2$ is applied across coil 24, the plate circuits of gate tubes 27 and 28 become alternately conductive, and the oscillations of A and B passing through these tubes shift each other's phase angles into in-phase relations in periodic sequence. Thus, at any given interval, one oscillator is capable of shifting the phase angle of the other's oscillation. Furthermore, while the oscillation of one oscillator is in a state of phase change, the oscillation of the other oscillator is in a steady state.

The blocks of limiter-amplitude-modulator circuits 17′, 23′; phase modulators 30, 30′; and the distributor blocks SWI—SWIV are shown with parallel connections for multiplex transmission. The distributor circuits are well known in the art of communication. For example, the distributor may consist of a plurality of targets 52–55, in the path of an electron beam in a vacuum envelope 50. Each target may be assigned to carry a particular signal, and the beam may rotate upon these targets to scan their signals in a predetermined sequence. Similarly, the intelligence wave sources, comprising blocks 6, 6′ and 7, 7′ are shown for multiplexing. However, the operation in either case is similiar, and reference will be made only to a single intelligence transmission. In this case, it will be assumed that the blocks 6 and 7 represent a common source of intelligence wave. Similarly, the distributors SWI—SWIV are short circuited, and the said phase modulators apply their output signals upon the first control grids of the said tubes by directing connection. In reference to the samplers of intelligence signals, as represented by the condensers C′, C″ and C‴, C⁗, the arrangement also indicates multiplexing. These condensers may be charged and discharged in rotation, for the necessary sequential distribution as required in multiplexing, such for example, by a distributor 50, so that the signal voltages across said condensers vary stepwise, as illustrated at E in Fig. 8. In general practice, the charges across these condensers, corresponding to the signals present across impedances Z10 and Z11, are switched on by the distributor, through rectifier tubes, such as shown by the numerals 8 and 9, and the discharges of these condensers are achieved by switching on electron tubes across the condensers, so as to dissipate the previously stored charges. The discharger tubes are not shown in Fig. 7, for simplicity of drawing, as the art of sampling in electronics is known, but reference may be made to the description of samplers in my copending application, Serial No. 752,601 filed June 5, 1947.

The outputs of intelligence wave blocks 6 and 7, as taken from across condensers C′ and C″, are applied upon the modulator circuits of blocks 17 and 23 respectively, to modulate the amplitudes of the oscillations of oscillators A and B. The modulated oscillations from blocks 17 and 23 are further phase modulated in blocks 30 and 33, each of which drives the first control grid of its respective gate tube 27 and 28. Thus, when the time dividing alternating wave from across coil 24 drives the gate tubes 27 and 28 alternately operative, the oscillations of the oscillators A and B shift each other's phase angles representative of intelligence in alternate intervals, by difference-angles measurable from their steady state resolutions. These continually phase shifted oscillations from oscillator coils 13 and 19 are limited in amplitude by the circuits of blocks 36, 37, and passed through the gate-and-wave-shaper blocks 38 and 39, to be combined in the transmitter 40. The gates 38 and 39 are operated periodically by the alternating control wave $f_m/2$ at coil 24. The application of this wave upon the gates 38 and 39 is not shown for simplicity of drawing. However, the phase of this control wave is so adjusted that, when the output oscillation of coil 13 of the oscillator A has resolved to a steady state, the gate 38 operates and this oscillation is passed on to the transmitter, while at the same time, the gate 39 is non-operative to prevent the changing phase of the oscillation of oscillator B entering the transmitter, and vice versa. Accordingly, the transmitter 40 receives carrier oscillations sequentially from two sources, A and B, at steps of a time division frequency, such that, the phase angle in each succeeding step is shifted in steady state representative of intelligence by a difference-angle measurable from a preceding angle.

In order to effect pure phase modulation at the transmitter, the time divided steps of the carrier are reshaped in amplitude by the gate-and-amplitude-modulator blocks 38 and 39, so that the abrupt changes of the carrier phase at the transmitter occurs at points, where the carrier level is substantially zero, as shown in Fig. 5. Accordingly, the outputs of gate-and-amplitude-modulators 38 and 39 are produced in periodic envelopes with gradual rise and fall at the boundaries. Modulators of this type have been disclosed in my above mentioned application, and another application, Serial Number 793,145, filed Dec. 22, 1947; the latter of which is now issued Patent No. 2,587,734, March 4, 1952.

*Various conditions of Fig. 1*

In reference to Fig. 7 the oscillator circuits of A and B must have low Q, in order to respond to phase shifts during short intervals, especially to the high repetition rate essential in television practice. In the event that the normal resolution of the oscillators A and B are less than one time-division period of the carrier, the damping tubes 44 and 45 may be included, to apply temporary damping during each phase shifting period.

In operation, the first control grids of these tubes are driven by their respective oscillators, and the output voltages across their plate circuits comprising impedance 46 and coupling condenser 47 of tube 45, and impedance 48 and coupling condenser 49 of tube 44 are applied upon their respective oscillators in degenerative opposition to dampen out said oscillations. These damping tubes are normally plate current cutoff biased by 29, and operated in synchronism with the gate tubes 27 and 28, by the control wave from across coil 24. In order to shorten the said damping time, the bias 29 may be increased upon the second control grids of damper tubes 44 and 45, in addition with the application of control wave $f_m$ from across coils 25 and 26, so that, the damper tubes 44 and 45 become operative only during the first half of the phase shifting periods, such as during the wave portions shown above the line 41, at G in Fig. 8.

The limiting action of blocks 36 and 37 are indicated for the reason that, during the operation periods of gate blocks 38 and 39, the oscillators A and B may not have resolved to their peak magnitudes. However, when the said oscillators are properly adjusted with respect to their decrements, the limiting actions of blocks 36 and 37 may be dispensed with.

The phase modulators of blocks 30 and 33 are known in the art of radio, and therefore, the type employed with the arrangement is immaterial herein.

*PH detector*

Fig. 9 shows one arrangement of a phase detector circuit that may be employed in accordance with the invention. The circuit comprises an amplitude limiter 56, which excites the grid of tube 57. The plate circuit comprises transformer of coils 58 and 59, and condensers 60 and 61. The tube 57 is employed as a cathode follower, and the cathode side of resistance 62 is connected to the center tap of coil 59. The voltage across resistance 62 will be in-phase with the input, and in the coil 59 in quadrature due to inductive transformation. Therefore, the rectified voltage across balanced resistances 63 and 64, and bypass condensers 65 and 66 will be normally zero through the rectifiers 67 and 68. However, due to the resolution delay in the transformer of coils 58 and 59, the quadrature phase will be disturbed, at the beginning of each time division of the I. F. carrier, and signal voltage will appear across the cathode terminal of diode 64.

While I have described particular embodiments of the invention, numerous substitutions of parts, adaptations and modifications are possible without departing from the spirit and scope thereof.

What I claim is:

1. Apparatus for phase modulating a time divided carrier wave which comprises the following parts: first and second oscillators of substantially a single carrier frequency, first and second output and input gates associated with each of these oscillators, a source of intelligence waves and means therefor to phase-modulate the first and second oscillators through the first and second input gates, a third gate to connect the wave voltage of the first oscillator to control the phase angle of the oscillation of the second oscillator, a fourth gate to connect the wave voltage of the second oscillator to control the phase angle of the oscillation of the first oscillator, an alternating wave source having a switching frequency equal half that of the maximum essential rate at which the statistical components of the said intelligence waves are to be conveyed per second, and means therefor to switch the said gates by the said switching wave, in an order that, when during one alternate period of the wave the first input gate is switched off and the first output gate is switched on, the second output gate is switched off while the second input gate and the third gate are switched on, whereby the oscillatory waves at the outputs of the first and second output gates shift with respect to each other representative of intelligence by difference-angles measurable from infinitely shifting reference angles.

2. In phase modulation system where the carrier wave is time divided at a sub-carrier frequency and in each time division the carrier phase is step-shifted representative of intelligence by a difference-angle that is measurable from the carrier phase in a previous time division, in combination means to translate said modulated carrier into the original intelligence, which comprises: amplitude limiter so as to cancel out amplitude modulation that may be present on the carrier, first and second circuits; the first circuit having slow phase-resolution time constant; and the second circuit having rapid phase-resolution time constant, means to pass said limited carrier through the first and second circuits, means to adjust the first and second circuits so that the carrier phase in their outputs will differ approximately by 90 degrees, two electron discharge devices; each having a cathode and anode, means to connect last-said devices at both ends of the first circuit; and a load impedance therefor through which alternately rectified oscillatory wave is passed in series with the electron discharge devices, a center tap across the first circuit and means to connect the second circuit from said tap to said load impedance, whereby the carrier oscillation in the second circuit is rectified through said discharge devices and added equally upon both sides of said load impedance during said 90 degree relation, and added unequally in proportion to signal-phase-modulation during change in said 90 degree relation by virtue of said slow phase resolution of the second circuit.

3. In phase modulation where the carrier phase angle is shifted representative of intelligence against reference phase angle, the method of shifting the reference angle infinitely, which comprises the steps of producing intelligence wave or waves, producing carrier wave, time dividing the carrier wave into trains of envelopes at a frequency rate essential to convey said intelligence, shifting phase angle of the carrier wave in each succeeding envelope by an angle representative of said intelligence wave or waves, in addition, shifting phase angle of the carrier in each succeeding envelope substantially by the angle that the carrier phase had been resolved in the preceding envelope, whereby the carrier phase is shifted in each succeeding envelope representative of intelligence by a difference-angle measurable from a preceding phase angle.

4. The method as set forth in claim 3, which includes in addition the steps of re-translating said phase modulations of the carrier into said intelligence wave or waves by comparing said succeeding phase angles with that of the succeeding phase angles.

5. The method of phase modulation, which comprises the following steps: producing intelligence wave or waves, producing carrier wave, time dividing the carrier wave into trains of envelopes at a frequency rate essential to convey said intelligence, shifting phase angle of the carrier wave in each succeeding envelope stepwise by an angle representative of said intelligence wave or waves, so that, each succeeding phase shift of the carrier remains substantially constant from boundary to boundary of the envelope, thereby to avoid effective frequency modulation during the time period of each succeeding envelope, in addition, shifting phase angle of the carrier wave in each succeeding envelope substantially by the angle that the carrier phase had been resolved in the preceding envelope in last said stepwise manner, whereby the carrier phase is shifted in each succeeding envelope representative of intelligence by a difference-angle measurable from a preceding phase angle, and waveshaping each succeeding envelope, so that, at the boundaries the carrier amplitude is substantially negligibly low, whereby to avoid appreciable sudden transient effect of the carrier wave due to sudden phase change at the boundaries, and the rise and fall at the boundaries are shaped substantially approximating to that of the sine-squared function, thereby to avoid widely expanded multiple pairs of complementary sidebands that are usually associated with steep sided rise and fall of the carrier envelopes, and transmitting the final modulated carrier wave.

6. The method as set forth in claim 5, which includes in addition the steps of receiving and re-translating said phase modulations of the carrier into said intelligence wave or waves.

7. The system of phase modulating a carrier wave, which comprises means to produce intelligence wave or waves, means to produce first and second substantially identical carrier oscillations, first and second gating means and switching means therefor to gate the outputs of these oscillations in alternate sequence at a time-dividing frequency rate essential to convey intelligence per second, means to combine the non-gated outputs of these gated oscillations, thereby to obtain a carrier consisting of the first and second oscillations in time-divided sequential segments. cross-coupled gates between the first and second oscillations, and means therefor to cross-couple the first and second oscillations relative to each other alternately by said switching means, in a sense that, during the first mentioned gated intervals of the first oscillation the phase angle of the first oscillation is shifted to substantially an in-phase relation to the second oscillation, and vice versa, phase modulator and means therefor to further phase modulate these cross-phase shifted first and second oscillations by said intelligence waves, whereby the phase of said sequential segments of the two oscillations vary representative of intelligence by difference-angles measurable from infinitely shifting reference angles.

8. The system of set forth in claim 7 which includes in addition means to amplitude shape said phase modulated sequential segments of the first and second oscillations, so that, at the boundaries the carrier amplitude is substantially negligibly low, whereby to avoid appreciable sudden transient effect of the carrier wave due to sudden phase change at the boundaries, and the rise and fall at the boundaries are shaped substantially approximating to that of the sine-squared function, thereby to avoid widely expanded multiple pairs of complementary sidebands that are usually associated with steep sided rise and fall of the carrier envelopes, means to transmit the final modulated carrier wave, means to receive same, and means to re-translate said phase modulations into said original intelligence.

9. The system as set forth in claim 8 which includes in addition means to re-translate said phase modulations into said original intelligence, which comprises a first means responsive substantially rapidly to the sudden phase shifts of said combined carrier segments, a second means having slower response to said sudden phase changes, whereby to retain phase angle of the oscillation in preceding said segment during an appreciable time length while phase angle of the oscillation in said first means has resolved to said succeeding phase angle, thereby to effect dissimilarity of phases as a function of intelligence, and means to compare phase angles of the oscillations in last said first and second means, whereby to derive said intelligence.

MEGUER V. KALFAIAN.

REFERENCES CITED

The following references are of record in the file of this patent:

UNITED STATES PATENTS

| Number | Name | Date |
|---|---|---|
| 1,882,119 | Chireix | Oct. 11, 1932 |
| 2,164,032 | Day | June 27, 1939 |
| 2,237,522 | Clark | Apr. 8, 1941 |
| 2,403,385 | Loughten | July 2, 1946 |
| 2,497,411 | Krumhansl | Feb. 14, 1950 |

FOREIGN PATENTS

| Number | Country | Date |
|---|---|---|
| 610,774 | Great Britain | Oct. 20, 1948 |